United States Patent
Kobayashi et al.

(10) Patent No.: US 9,612,407 B2
(45) Date of Patent: Apr. 4, 2017

(54) OPTICAL COUPLER FOR MULTICORE FIBER

(71) Applicants: OPTOQUEST CO., LTD., Ageo, Saitama (JP); ADAMANT CO., LTD., Adachi-ku, Tokyo (JP)

(72) Inventors: Tetsuya Kobayashi, Ageo (JP); Haruyuki Endo, Ageo (JP); Kazuaki Ikegai, Tokyo (JP); Isao Yamauchi, Tokyo (JP)

(73) Assignees: OPTOQUEST CO., LTD., Saitama (JP); ADAMANT CO., LTD., Tokyo (JP)

(*) Notice: Subject to any disclaimer, the term of this patent is extended or adjusted under 35 U.S.C. 154(b) by 0 days.

(21) Appl. No.: 14/777,740

(22) PCT Filed: Mar. 5, 2014

(86) PCT No.: PCT/JP2014/055578
§ 371 (c)(1),
(2) Date: Sep. 16, 2015

(87) PCT Pub. No.: WO2014/148253
PCT Pub. Date: Sep. 25, 2014

(65) Prior Publication Data
US 2016/0259133 A1    Sep. 8, 2016

(30) Foreign Application Priority Data
Mar. 18, 2013 (JP) .................................. 2013-055821

(51) Int. Cl.
*G02B 6/38*   (2006.01)

(52) U.S. Cl.
CPC ........... *G02B 6/3869* (2013.01); *G02B 6/381* (2013.01); *G02B 6/3885* (2013.01); *G02B 6/3877* (2013.01)

(58) Field of Classification Search
CPC ..... G02B 6/381; G02B 6/3821; G02B 6/3869
See application file for complete search history.

(56) References Cited

U.S. PATENT DOCUMENTS

| | | | | |
|---|---|---|---|---|
| 4,279,467 A | * | 7/1981 | Borsuk | G02B 6/3847 385/65 |
| 4,807,957 A | * | 2/1989 | de Jong | G02B 6/3821 385/60 |

(Continued)

FOREIGN PATENT DOCUMENTS

| | | |
|---|---|---|
| CN | 201740883 U | 2/2011 |
| EP | 1072916 A1 | 1/2001 |

(Continued)

OTHER PUBLICATIONS

International Search Report of International application No. PCT/JP2014/055578 completed Apr. 30, 2014 and mailed May 20, 2014 (4 pages).
Office Action of Chinese patent application No. 201480016874.4 dated Apr. 5, 2016 (6 pages).

*Primary Examiner* — Daniel Petkovsek
(74) *Attorney, Agent, or Firm* — Pyprus Pte Ltd

(57) ABSTRACT

An optical connector of the present invention includes a ferrule that holds a multicore fiber, and a plug frame equipping the ferrule housed therein. The ferrule has at least one flat surface on the outer circumferential surface thereof, and the plug frame has a plate spring structure to apply pressure on the flat surface. In the optical connector of the present invention, the plate spring structure is casted in the plug frame.

3 Claims, 3 Drawing Sheets

(56) References Cited

U.S. PATENT DOCUMENTS

| | | | | |
|---|---|---|---|---|
| 5,214,730 | A * | 5/1993 | Nagasawa | G02B 6/3821 385/59 |
| 6,287,018 | B1 * | 9/2001 | Andrews | G02B 6/3831 385/139 |
| 6,935,790 | B2 * | 8/2005 | Ozaki | G02B 6/3879 385/136 |
| 9,250,395 | B2 * | 2/2016 | Nielson | G02B 6/3821 |
| 2002/0085815 | A1 * | 7/2002 | Shinagawa | G02B 6/3871 385/78 |
| 2005/0013549 | A1 * | 1/2005 | Terakura | G02B 6/3843 385/78 |
| 2005/0201690 | A1 * | 9/2005 | Taira | G02B 6/3849 385/53 |
| 2007/0133926 | A1 * | 6/2007 | Semmler | G02B 6/3806 385/72 |
| 2009/0116794 | A1 * | 5/2009 | Katagiyama | G02B 6/3898 385/81 |
| 2011/0229085 | A1 * | 9/2011 | Bradley | G02B 6/3885 385/78 |

FOREIGN PATENT DOCUMENTS

| | | |
|---|---|---|
| JP | 10-509523 A | 9/1998 |
| JP | 11-38272 A | 2/1999 |
| JP | 2003-185881 A | 7/2003 |
| JP | 2009-115864 A | 5/2009 |
| JP | WO2010/038861 A1 | 4/2010 |
| JP | WO2010/038863 A1 | 4/2010 |
| JP | 2010-286548 A | 12/2010 |
| JP | 2010-286718 A | 12/2010 |
| JP | 2011-75829 A | 4/2011 |
| JP | 2011-158768 A | 8/2011 |
| WO | WO2011/116133 A1 | 9/2011 |

* cited by examiner (a)

(b)

OPTICAL COUPLER FOR MULTICORE FIBER

TECHNICAL FIELD

The present invention relates to an optical connector for a multicore fiber.

BACKGROUND ART

For example, WO 2010/038861 A (Patent Literature 1) and WO 2010/038863 A (Patent Literature 2) disclose a multicore fiber having multiple propagating cores in a single fiber.

An optical coupler (connector), which can couple multicore fibers each other with low loss and can be used without loss variation when repeatedly attaching and detaching, is needed for optical communication by using the multicore fibers as a transmission line.

JP 2010-286548 A (Patent Literature 3), JP 2010-286718 A (Patent Literature 4), and JP 2011-158768 A (Patent Literature 5) disclose a method for coupling multicore fibers each other.

CITATION LIST

Patent Literatures

Patent Literature 1: WO 2010/038861 A
Patent Literature 2: WO 2010/038863 A
Patent Literature 3: JP 2010-286548 A
Patent Literature 4: JP 2010-286718 A
Patent Literature 5: JP 2011-158768 A Various types of optical connectors have been standardized so far aiming at user convenience by communalizing the size and other specifications. Present standardized connectors include SC type, FC type, MU type, and LC type optical connectors.

Regarding an external dimension and other specifications of the SC type optical connector, an external diameter of the SC type and the FC type ferrule classified in grade 1 in IEC 61754-13, TIA/EIA-604-3A, and TIA/EIA-604-4A, and in grade B in JIS C 5983 and 5970, is specified to 2.499±0.0005 mm.

SUMMARY OF INVENTION

Technical Problem

A multicore fiber has multiple cores other than the center core. Therefore, if an axial rotation of the multicore fiber occurs (rotation around the principal axis), the core positions are rotated, leading to a connection loss. If the core positions are rotated everytime the multicore fiber to be connected is attached/detached, connection loss changes. Therefore, a connector is desired that doesn't cause core position rotation of the multicore fiber.

Solution to Problem

The present invention is basically based on knowledge that core position rotation of a multicore fiber can be prevented by applying pressure on a flange of a ferrule storing the multicore fiber from multiple directions. Also, it is based on knowledge that the core position rotation of the multicore fiber can be prevented by providing a flat surface on a flange of the ferrule and applying pressure on the flat surface of the ferrule by plate spring structure. Furthermore, it is based on knowledge that a structure for applying pressure on the flat surface of the ferrule flange can be simply provided by casting the plate spring and the frame of the plug frame of existing connector.

The present invention relates to an optical connector 17 comprising a ferrule 13 holding a multicore fiber 11 and a plug frame 15 storing the ferrule 13. The ferrule 13 in the optical connector 17 comprises at least one flat surface 19 on an outer peripheral surface. The plug frame 15 comprises a plate spring structure 21 for pressurizing the flat surface 19. The plate spring structure 21 and the plug frame 15 are casted.

Advantageous Effects of Invention

As described above, an optical connector of the present invention can prevent a ferrule from rotating around its axis and prevent rotation of a multicore fiber by providing a flat surface on a flange of the ferrule and applying pressure on the flat surface from a plug frame side by using a plate spring structure. Since the component for applying pressure on the flat surface has the plate spring structure the ferrule easily returns to its original state even if the ferrule is pressed from X and Y directions. Therefore, reproductivity of the optical connector in connection state can be significantly improved.

Also, since the optical connector of to the present invention even if the ferrule is pressed from X and Y directions the flat surface of the ferrule flange by the plate spring structure, the position in the Z axis of a multicore fiber can be moved. Therefore, when a ferrule is pressed and pushed for physical contact of fibers, the Z axis can be moved while preventing the multicore fiber from rotating around its axis.

Furthermore, the optical connector of the present invention, a plate spring structure is casted in a plug frame of a standardized optical connector, and therefore components of the standardized optical connector can be used as components other than the plug frame, and an inexpensive optical connector for a multicore fiber can be provided without separately providing a component for applying pressure on the flat surface of a ferrule flange in the plug frame and increasing the number of components.

The optical connector of the present invention preferably comprises four flat surfaces 19a, 19b, 19c, and 19d on an outer peripheral surface of the ferrule 13. Further, the plug frame 15 comprises four plate spring structures 21a, 21b, 21c, and 21d applying pressure on corresponding to the four flat surfaces 19a, 19b, 19c, and 19d, respectively. In this manner, rotation of a multicore fiber can be effectively prevented by providing the four plate spring structures 21a, 21b, 21c, and 21d corresponding to the four flat surfaces 19a, 19b, 19c, and 19d, respectively.

In the optical connector of the present invention, an outer end 23 of the ferrule 13 is preferably inserted into an optical adapter comprising a split sleeve 25. As described above, two multicore fibers can be connected in the same method as a standardized optical connector by inserting the outer end 23 of the ferrule 13 into the split sleeve 25 and inserting another optical connector into the other side end of the split sleeve 25.

DESCRIPTION OF EMBODIMENTS

Figure 1:
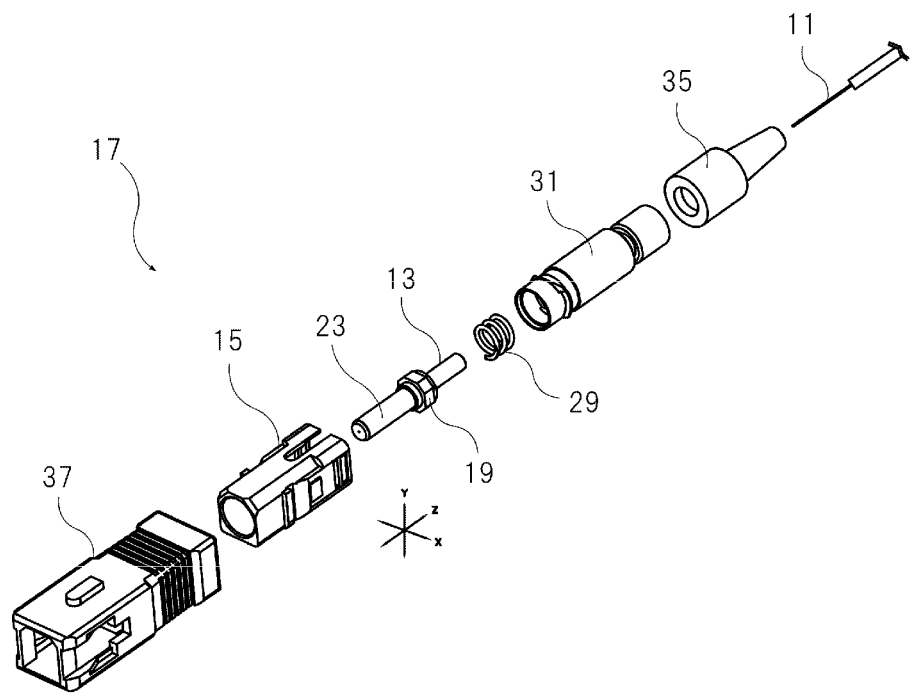
FIG. 1 is an exploded perspective view of an optical coupler of the present invention.
Figure 2:
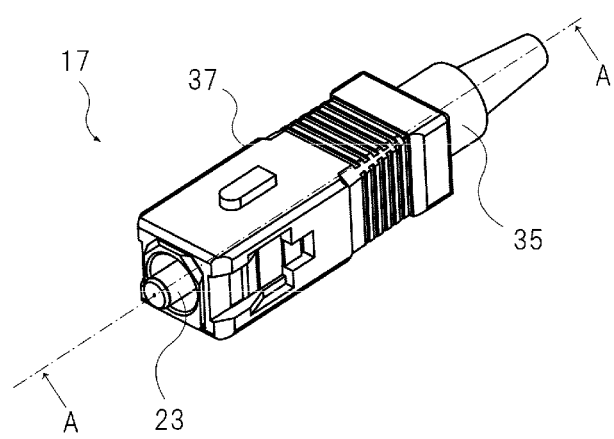
FIG. 2 is a perspective view illustrating an working example of the optical connector of the present invention.

FIG. 1 is an exploded perspective view of an optical coupler of the present invention. FIG. 2 is a perspective view illustrating a working example of the optical coupler of the present invention. FIG. 3(a) is a cross-sectional view along line A-A illustrated in FIG. 2. FIG. 3(b) is an enlarged view of part B illustrated in FIG. 3(a). FIG. 4 is a schematic view of the present invention plug frame when a ferrule is stored.

Figure 3:
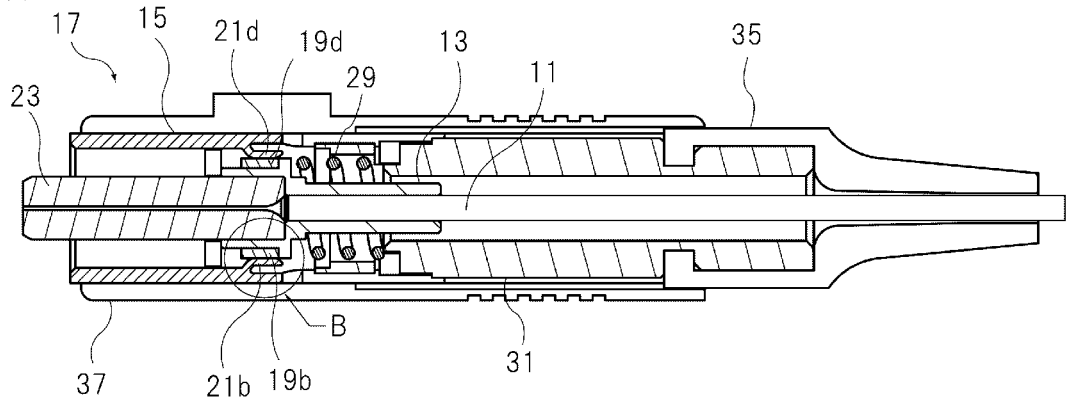
FIG. 3(a) is a cross-sectional view of FIG. 2 along line A-A illustrated in FIG. 2.
FIG. 3(b) is an enlarged view of encircled part B illustrated in FIG. 3(a).
Figure 3:
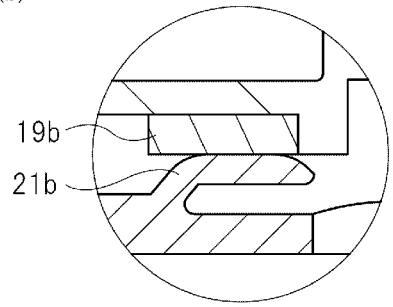
Figure 4:
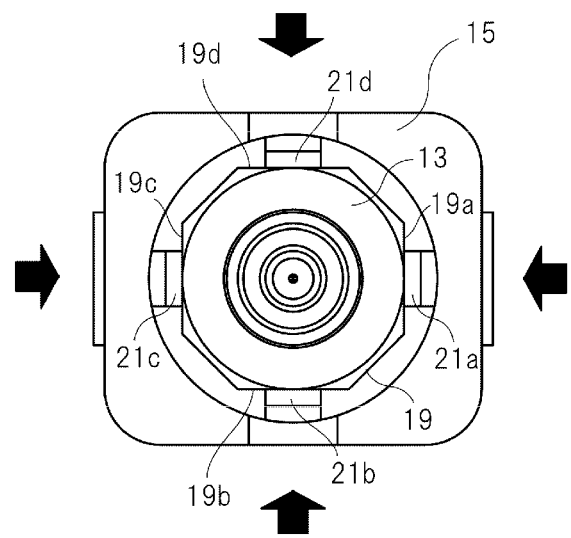
FIG. 4 is a schematic view of the present invention plug frame when a ferrule is stored.

In the example illustrated in FIGS. 1 and 3, an optical connector 17 of the present invention comprises a ferrule 13 that holds and stores an optical fiber 11, a plug frame 15 that stores the ferrule 13, a stop ring 31 that fits to the plug frame 15 via a coil spring 29, a connector strain relief boot 35, and a knob 37 that stores the above components.

The optical connector 17 is an optical component used for connecting a multicore fiber and a single mode fiber or two multicore fibers each. When multicore fibers are connected, it is preferable that the core arrangement of the multicore fibers is the same. In this case, corresponding cores of the two multicore fibers are optically connected by using the optical connector of the present invention.

The multicore fiber 11 is an optical fiber comprising multiple cores in one fiber as disclosed in the above-described patent literatures. An example of the multicore fiber 11 is a fiber having a center core and one or multiple cores around the center core. The multicore fiber 11 may not have a core at the center. For example, a multicore fiber used in the present invention may be a multicore fiber having two to four (or more than four) cores which are symmetrically arranged.

The center core means a core arranged at a center position of the multicore fiber. A distance between cores is, for example, 30 μm or more and 60 μm or less. The distance between cores means a distance from a core to an adjacent core.

The ferrule 13 is a known optical component to hold an optical fiber. The ferrule 13 is a storage body to store a part of the multicore fiber 11 therein. Generally, the ferrule 13 is placed at the end of the multicore fiber 11 and used to connect other optical fiber. The ferrule 13 may comprise one component or two or more components. In an example illustrate in FIG. 1, a ferrule flange 19 is placed at the end of a ferrule main body on a substantial cylinder (column).

The plug frame 15 is a storage body to store the ferrule 13 therein. Plate spring structures 21a, 21b, 21c, and 21d to apply pressure on the ferrule 13 may be cast structure in the plug frame 15, and the plug frame 15 may store the ferrule 13 therein. An example of the plug frame 15 is a main body of an optical connector. The plug frame 15 is a cast structure of resin such as nylon resin, polybutylene terephthalate (PBT) resin, and liquid crystal polymer (LCP) resin by using a mold.

The ferrule 13 in the optical connector 17 of the present invention comprises at least one flat surface 19 on an outer peripheral surface thereof. The flat surface may be almost flat. A flat portion may be formed like a bottom of a groove. The groove may be formed at four positions rotated around an axis by 90°. In an example illustrated in FIG. 3, the ferrule flange 19 is pressed by a plate spring structure.

The plug frame 15 comprises a plate spring structure 21 to apply pressure on the flat surface 19. As illustrated in FIG. 3, the plate spring structure 21 is casted in the plug frame 15.

As described above, rotary movement of a ferrule around its principal axis and rotary movement of a multicore fiber can be prevented by providing the flat surface 19 on an outer peripheral surface of the ferrule 13 and to apply pressure on the flat surface 19 from the plug frame 15 side by using the plate spring structure 21.

Since the optical connector 17 of the present invention contacts and apply pressure on the flat surface on the outer periphery of the ferrule 13 by the plate spring structure 21, the positions of X, Y, and Z axes of the multicore fiber 11 can be moved. Therefore, as described above, the positions of the X, Y, and Z axes can be moved while preventing a multicore fiber from rotating around its principal axis.

Furthermore, in the optical connector 17 of the present invention, the plate spring structure 21 is casted in the plug frame 15, and therefore a component to apply pressure on the flat surface 19 on an outer periphery of the ferrule 13 does not need to be separately assembled in the plug frame. For example, in the optical coupler 17 of the present invention, components having a spring for pressurizing flat surfaces 19a, 19b, 19c, and 19d on an outer periphery of the ferrule 13 do not need to be assembled in the plug frame 15. In this manner, a structure to apply pressure on the flat surface on the outer periphery of the ferrule can be easily provided. Also, as for manufacturing a plug frame of the present invention, for example, the plug frame and a plate spring structure can be casted by resin molding using a metal mold. Therefore, an optical connector having a structure to apply pressure on a flat surface on the outer periphery of a ferrule can be inexpensively provided.

The optical connector of the present invention preferably comprises four flat surfaces 19a, 19b, 19c, and 19d on the outer peripheral surface of the ferrule 13. Further, the plug frame 15 comprises four plate spring structures 21a, 21b, 21c, and 21d corresponding to the four flat surfaces 19a, 19b, 19c, and 19d and to apply pressure on each of the four flat surfaces 19a, 19b, 19c, and 19d, respectively. By equipping the above structure, rotation of a multicore fiber around its principal axis can be effectively prevented. In the ferrule 13, at least a section pressed by a plate spring is preferably a square (Round corners are acceptable). If a shape of the pressed portion in the ferrule 13 is substantially square, the ferrule rotates around its principal axis can be prevented. In this manner, the four flat surfaces are preferably arranged at positions rotated around a center axis of the ferrule (or a center axis of a fiber) by 90° step.

In the optical connector 17 of the present invention, a component to press a flat surface on the outer periphery of a ferrule is a plate spring. Especially, if the ferrule comprise the four flat surfaces 19a, 19b, 19c, and 19d, opposite surfaces respectively comprise the plate spring structures 21a, 21b, 21c and 21d. Therefore, according to the present invention, when the ferrule is pressurized from X, Y and Z directions, the ferrule easily returns to its original position. As a result, according to the present invention, reproducibility of an optical connector in connection state can be significantly improved. Especially, in the optical coupler of the present invention, even if an outer end 23 of the ferrule is inserted into a split sleeve 25 to connect fibers each other, positions of the X, Y axes can be flexibly moved, and also a multicore fiber rotation around its principal axis can be prevented. Therefore, fibers can be easily connected each other, and the connection loss increase by deviation of the X and Y axes is prevented.

In the optical connector of the present invention, the outer end 23 of the ferrule 13 is preferably inserted into an optical adapter comprising a split sleeve 25. Two optical fibers can be connected by equipping the above structure and closely contacting to another optical connector inserted from the opposite end of the split sleeve 25. The split sleeve 25 is an optical device for optically connecting each of cores of two multicore fibers and maintaining connection state thereof by storing ferrules of the two optical connectors in close contact with each other. The inside of the split sleeve 25 has a shape, for example, corresponding to an outer periphery of the outer end 23 of the ferrule 13. Therefore, the split sleeve 25 can stably hold the two ferrules 13.

Figure 5:
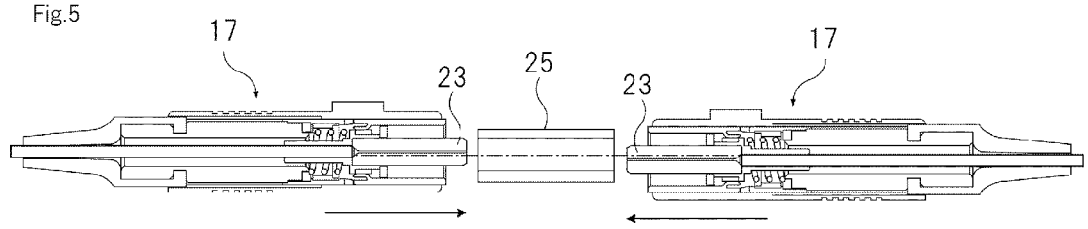
FIG. 5 is a schematic view for describing how to connect multicore fibers by using the optical connector of the present invention.

FIG. 5 is a schematic view to show a method to connect multicore fibers by using the optical connector of the present invention. As illustrated in FIG. 5, the outer end 23 of the ferrule 13 is inserted from one end of the split sleeve 25. Specifically, an inner diameter of the split sleeve 25 is designed to store the outer end 23 of the ferrule 13. At the same time, another optical connector is inserted from an opposite end of the split sleeve 25. A multicore fiber is also stored in this optical connector.

Figure 6:
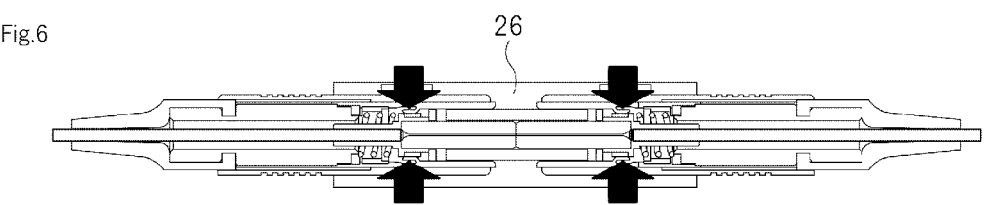
FIG. 6 is a schematic view in the case where two multicore fibers are connected by using the optical connector of the present invention.

FIG. 6 is a schematic view when two multicore fibers are connected by using the optical connector of the present invention. As illustrated in FIG. 6, an optical connector is inserted into each of two ends of one split sleeve 25, and multicore fibers stored in each optical connector are closely contacted each other. In this manner, each of cores in the multicore fibers is optically connected.

The coil spring 29 is a component to make pressure bonding of fibers each other by pushing the ferrule 13 forward by coming into contact therewith. The stop ring 31 is a component to support a back end of the coil spring 29.

In the example illustrated in FIG. 3, the stop ring 31 fits to the plug frame 15, and the coil spring 29 comes into contact with the ferrule 13 in the plug frame 15.

The connector boot 35 protects a cable inserted to the optical fiber 11. In the example illustrated in FIG. 3, the connector boot 35 fits to the stop ring 31 and protrudes outside from the knob 37. The connector boot 35 is flexible and therefore can reduce optical transmission loss generated by lateral pressure which increases when an optical fiber cable is bent.

The knob 37 is a storage body to store the above-described components therein. As illustrated in FIG. 2, when the knob 37 is assembled with the above components, the optical connector 17 of the present invention is completed. The shape of the knob 37 is rectangular and molded of resin such as nylon resin, PBT resin, and LCP resin.

Example 1

A flange of a ferrule has a reference surface structure in the present example. A portion of the surface structure is pressed by a plate spring structure added in a plug frame. In this example, the ferrule is held in a connector without rotating around its principal axis by applying pressure on a flat surface on an outer periphery of the ferrule from four directions. In this structure, the ferrule is drawn into the connector when fibers are closely coupled each other. However, a plate spring structure slides in a Z axis direction while maintaining pressing the flange of the ferrule, and an axial rotation of the ferrule does not occur. Also, when positions of X and Y axes of a fiber have been deviated due to component inaccuracy of an adapter and a connector, one side of a plate spring is compressed, and a plate spring placed on an opposite surface keeps applying pressure, and therefore an axial rotation does not occur even if the positions in X or Y axes of the ferrule are moved. As described above, an optical coupler for a multicore fiber is realized that can be reproductively attached and detached.

INDUSTRIAL APPLICABILITY

The present invention is utilized in fields of optical devices and optical communication.

REFERENCE SIGNS LIST 11 multicore fiber
13 ferrule
15 plug frame
17 optical coupler
19 flange
19a, 19b, 19c, 19d flat surface
21a, 21b, 21c, 21d plate spring structure
23 outer end of ferrule
25 split sleeve
26 optical adapter
29 coil spring
31 stop ring
35 connector strain relief boot
37 knob

The invention claimed is:

1. An optical coupler for a multicore fiber, wherein:
the optical coupler comprises a ferrule holding a multicore fiber and a plug frame storing the ferrule;
the ferrule comprises at least one flat surface on an outer peripheral surface;
the plug frame comprises a plate spring structure to apply pressure on the flat surface; and
the plate spring structure is integrally molded in the plug frame, wherein:
the at least one flat surface comprises four flat surfaces, the four flat surfaces being arranged at positions rotated around a central axis of the ferrule by 90°, and
the plate spring structure comprises four plate spring structures configured to press the four flat surfaces.

2. The optical coupler according to claim 1, wherein an outer end of the ferrule is inserted into an optical adapter comprising a split sleeve.

3. The optical coupler according to claim 1, wherein the optical coupler is applicable to an SC resin connector, an LC resin connector, and an MU resin connector, used in an optical fiber.

* * * * *